(No Model.) 3 Sheets—Sheet 1.
C. P. PERKINS.
INSEAM TRIMMING MACHINE.
No. 492,991. Patented Mar. 7, 1893.
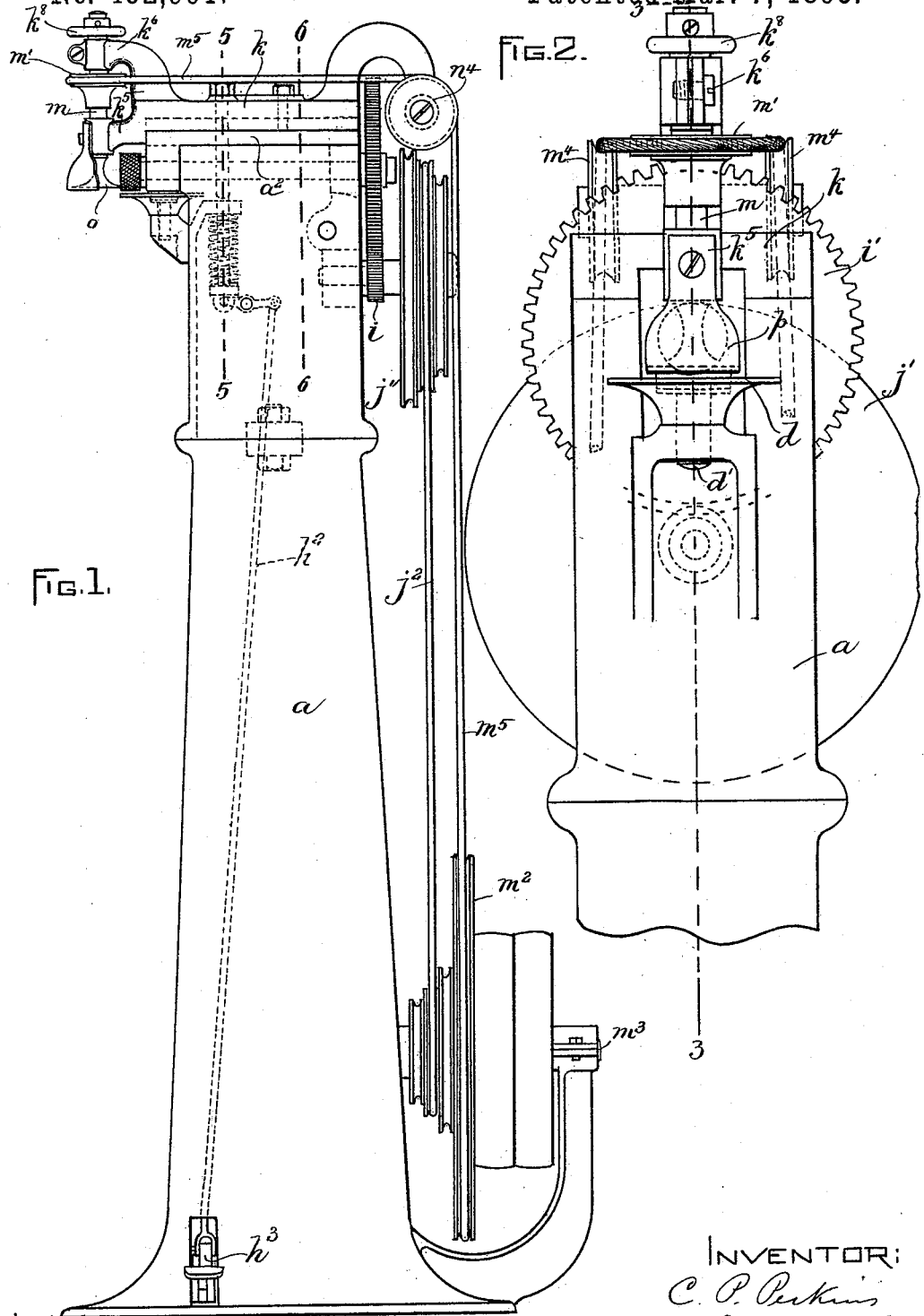
WITNESSES:
A. D. Harrison
W. S. McLeod
INVENTOR:
C. P. Perkins
by Wright Brown Crosby
Atty.

(No Model.) 3 Sheets—Sheet 2.

C. P. PERKINS.
INSEAM TRIMMING MACHINE.

No. 492,991. Patented Mar. 7, 1893.

WITNESSES:
A. D. Harrison.
W. S. McLeod

INVENTOR:
C. P. Perkins
by Wright H Brown Crowley
Attys.

(No Model.) 3 Sheets—Sheet 3.
C. P. PERKINS.
INSEAM TRIMMING MACHINE.
No. 492,991. Patented Mar. 7, 1893.
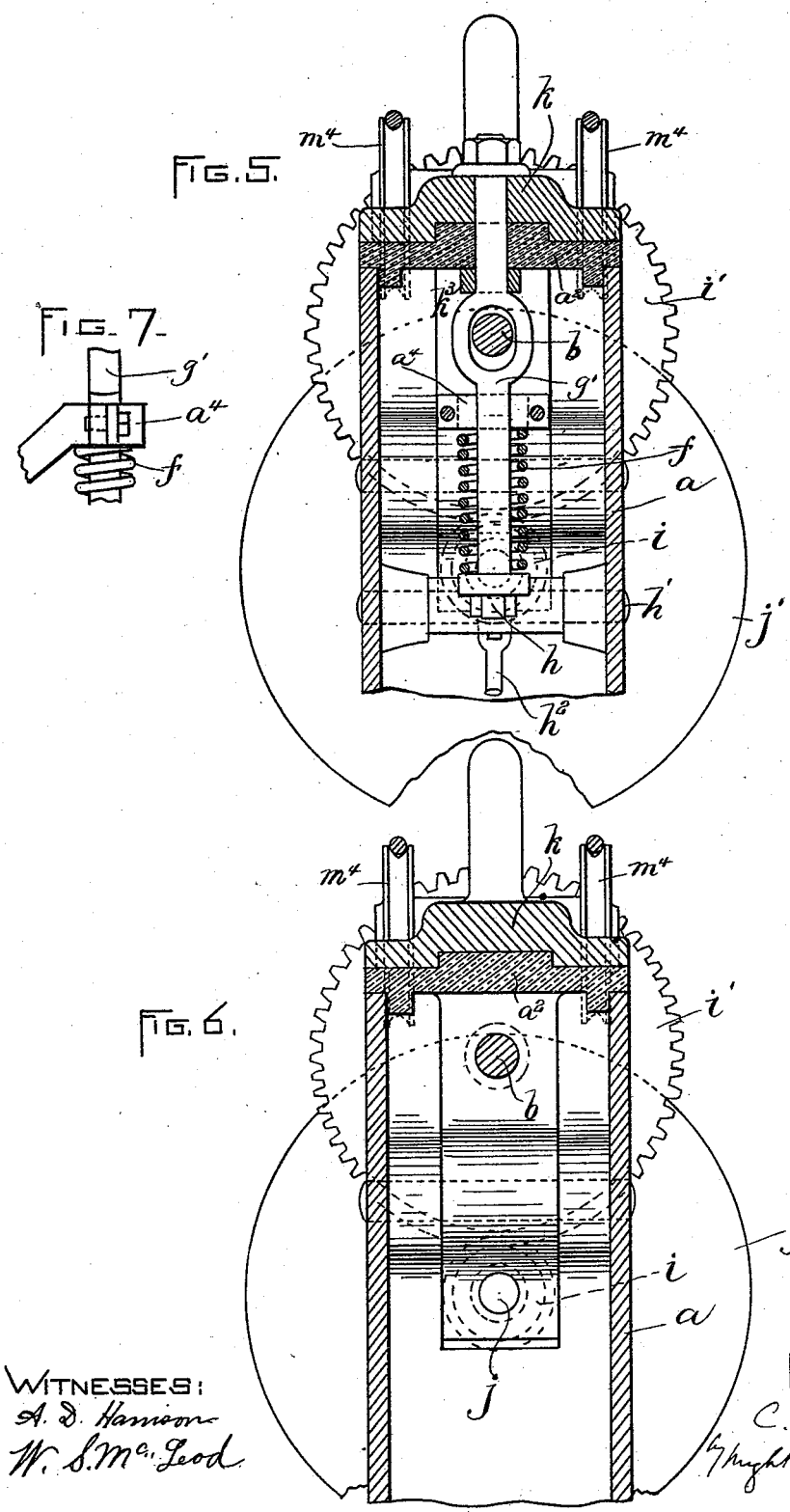
WITNESSES:
A. D. Harrison
W. S. McLeod
INVENTOR:
C. P. Perkins
by Wright Brown Crosley
Attys.

UNITED STATES PATENT OFFICE.

CHARLES P. PERKINS, OF BROCKTON, MASSACHUSETTS.

INSEAM-TRIMMING MACHINE.

SPECIFICATION forming part of Letters Patent No. 492,991, dated March 7, 1893.

Application filed December 15, 1892. Serial No. 455,290. (No model.)

*To all whom it may concern:*

Be it known that I, CHARLES P. PERKINS, of Brockton, in the county of Plymouth and State of Massachusetts, have invented certain new and useful Improvements in Inseam-Trimming Machines, of which the following is a specification.

This invention relates to machines for trimming the edges of the welt and upper of a welted boot or shoe close to the inner seam which unites said welt and upper to the inner sole of the boot or shoe, this operation being known as trimming the inseam. It has generally been the practice to trim the inner seam by hand, although in some cases a machine has been provided, comprising a support for one side of the welt, a feed-roll to bear upon the opposite side of the welt, and a rotary cutter arranged to act upon the edges of the welt and upper at a point in close proximity to the outer end of the feed-roll. In all machines for this purpose of which I am aware, the cutter has been arranged to rotate in a plane parallel with the rotation of the feed-roll, and has been mounted upon the same axis with the feed-roll, so that no provision could be made for independent adjustment of the cutter to compensate for wear of its cutting edge.

My invention has for its object to provide an inseam trimmer, in which the trimming knife or cutter shall be independently adjustable, so that wear of its cutting edge may be compensated and for the trimming operation performed as close to the line of stitches as may be desired.

To these ends my invention consists in the improved construction which I will now proceed to describe.

Figure 3:
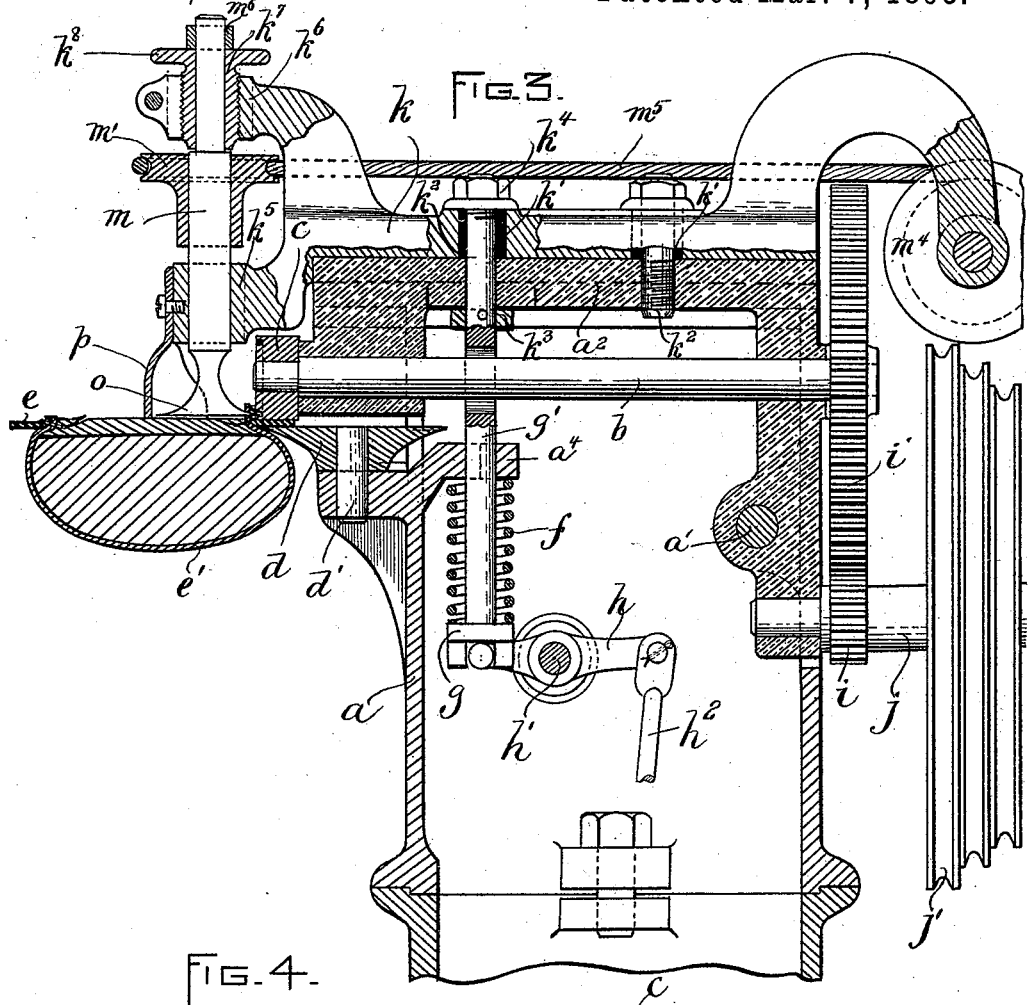
Figure 4:
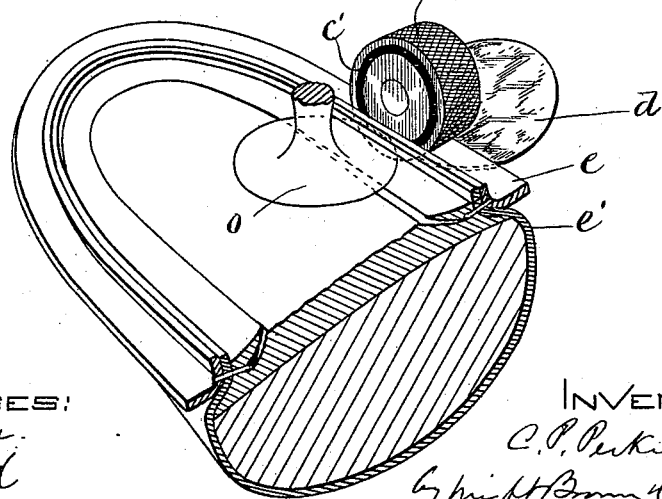

In the accompanying drawings, forming part of this specification: Figure 1 represents a side elevation of an inseam-trimming machine embodying my improvements. Fig. 2 represents a front elevation of a portion of the machine, on a larger scale. Fig. 3 represents a section on line 3—3, Fig. 2. Fig. 4 represents a perspective view of a portion of a welted boot or shoe, said view showing also the trimming knife, feed-roll and welt-support. Fig. 5 represents a section on line 5—5, Fig. 1. Fig. 6 represents a section on line 6—6, Fig. 1. Fig. 7 represents a detail view hereinafter referred to.

The same letters of reference indicate the same parts in all the figures.

In the drawings: $a$ represents a supporting standard or pedestal, to which is pivotally connected at $a'$ a head or frame $a^2$, adapted by its pivotal connection with the standard to swing vertically.

$b$ represents a shaft, journaled in bearings in the swinging frame $a^2$ and provided at one end outside of the said frame with a feed-roll $c$, which is rigidly attached to the shaft and preferably has its periphery milled or corrugated.

$d$ represents a disk, mounted to rotate loosely on a vertical stud $d'$ affixed to the standard $a$. The upper surface of said disk is substantially flat and serves to support the under side of the welt $e$, as shown in Figs. 3 and 4. The under surface of the disk is beveled, so that the outer edge of the disk is reduced to a thin edge capable of entering the crease between the welt $e$ and the upper $e'$. The feed-roll $c$ is arranged over the disk $d$, as shown in Fig. 3, so that, during the trimming operation, the welt is interposed between the disk and feed-roll, the projecting edges of the upper and welt which are to be trimmed or cut away by the operation of the machine standing in close proximity to the outer end of the feed-roll. It will be seen that the pivotal connection of the frame $a^2$ with the standard $a$ enables the feed-roll to move toward and from the disk $d$. The feed-roll is normally pressed downward toward the disk with a yielding pressure, caused by a spring $f$, which is interposed between a perforated ear $a^4$ affixed to the standard $a$, and a head or shoulder $g$ on a rod $g'$ which is secured to the frame $a^2$ and is adapted to slide in the ear $a^4$. The frame $a^2$ may be raised against the pressure of the spring $f$, to permit the insertion of the welt between the feed-roll and the disk $d$, by means of a lever $h$, pivoted at $h'$ to the standard $a$, one end of said lever being engaged with the lower end of the rod $g'$; and a rod $h^2$, connecting the other end of said lever with a treadle $h^3$ located near the base of the standard $a$. A pressure of the operator's foot upon the treadle $h^3$ will depress the rod $h^2$ and thereby raise the rod $g'$ with the frame $a^2$ and the feed-roll. The feed-roll is rotated by means of a pinion $i$, affixed to a shaft $j$, which may be driven by a belt upon a pulley $j'$ affixed to said shaft, and a gear $i'$ affixed to the feed-roll shaft $b$ and meshing with the pulley $i$. The pulley $j'$ receives motion through a belt $j^2$ from a pulley on the driving-shaft $m^3$.

$k$ represents a supplemental frame, mounted upon the swinging frame $a^2$, and rendered adjustable thereon by means of slots $k'$ $k'$ in said supplemental frame, one of said slots receiving the rod $g'$ and the other the bolt $k^2$. Said rod and bolt secure the supplemental frame $k$ to the frame $a^2$, the bolt $k^2$ being screw-threaded and engaged with an internal thread in the frame $a^2$, while the rod $g'$ has a collar or shoulder $k^3$, bearing on the under side of the frame $a^2$, and a nut $k^4$ bearing on the upper side of the frame $k$.

$m$ represents a vertical cutter-shaft, journaled in bearings formed in arms $k^5$ $k^6$ on the frame $k$, said shaft $m$ being substantially at right angles with the feed-roll shaft $b$. The shaft $m$ is provided at its lower end with a disk-shaped knife $o$, the circular cutting edge of which is arranged horizontally and opposite the outer end of the feed-roll $c$. The feed-roll has in its outer end a groove or recess $c'$, and the knife $o$ is arranged so that a part of its cutting edge projects slightly into said recess, as shown in Fig. 3, so that the end of the feed-roll above and below the cutting edge of the knife will form a recess or support for the projecting edges to be trimmed by the knife, so that the knife is enabled to trim said edges without that difficulty which would arise if the edges were free to yield to the lateral pressure of the knife against it.

The cutter-shaft $m$ is rotated by means of a belt $m^5$, running upon a pulley $m'$ affixed to said shaft, said belt receiving motion from a pulley $m^2$ on a driving-shaft $m^3$. An idle pulley $m^4$ supports the belt $m^5$ and changes its direction, as shown in Figs. 2 and 3.

It will be seen that the described adjustable connection of the frame $k$ to the frame $a^2$ enables the shaft $m$ and knife or cutter $o$ to be adjusted horizontally toward and from the feed-roll, so that the knife may be caused to project to any desired extent into the groove or recess in the end of the feed-roll, and may be moved up toward the feed-roll to compensate for wear of its cutting edge. I prefer to make the shaft $m$ and knife or cutter $o$ also vertically adjustable, so that the knife may cut closer to or farther from the inseam. To this end, I provide the arm $k^6$ with a bearing $k^7$, which is vertically adjustable in said arm and receives the upper portion of the shaft $m$, said shaft having a collar or shoulder $m^6$ at its upper end, bearing on the upper end of the bearing $k^7$. The bearing $k^7$ is externally screw-threaded, and engages with an internal thread formed in the arm $k^6$, so that, by rotation of said bearing, which is or may be provided with a hand-wheel $k^8$, the shaft $m$ and knife or cutter $o$ may be vertically adjustable.

$p$ represents a hood or guard, which partially incloses the knife $o$ and is affixed to the arm $k^5$, said guard projecting slightly below the knife and being arranged so that it prevents contact between the inner-sole and the cutting edge of the knife.

The operation of the machine is as follows: When an inseam is to be trimmed, the operator raises the feed-roll by giving an upward swinging motion to the frame $a^2$, the knife or cutter being raised with the feed-roll, and inserts the welt between the feed-roll and the disk $d$. The frame $a^2$ is then released and the spring $f$ presses the feed-roll downwardly upon the welt. The feed-roll and cutter are then rotated, and the cutter trims the projecting edges of the upper and welt as fast as the latter are fed along by the feed-roll.

As already stated, I am aware that a cutter has been arranged at the outer end of a feed-roll to trim the projecting edges of the welt and upper, said cutter revolving on a horizontal axis and being incapable of independent adjustment.

It is obvious that, as the cutter wears, the height of the trimmed edge above the same will be increased when the cutter is on the same axis with the feed-roll and is not adjustable to compensate for wear. This objection is obviated by my improved construction, the cutter being independently adjustable. Furthermore, the height of the cutter above the inseam is not varied by wear of its cutting edge, so that the only adjustment of the knife that is needed is that required to keep the cutting edge in proper relation to the recessed end of the feed-roll.

I find that a disk-shaped cutter with a continuous cutting edge, arranged as shown relatively to the feed-roll, so that the feed-roll supports the edges while they are being trimmed, against the pressure exerted on said edges by the knife, produces a much better result and enables the trimmed edge to be made much neater and smoother than would be the case if a rotating cutter on a horizontal axis were employed.

I claim—

1. The combination of the loosely-rotating welt-supporting disk, a feed-roll located over said disk, means for rotating the feed-roll, a rotary disk knife mounted on a shaft substantially at right angles with the axis of the feed-roll, means for rotating said shaft, and means for adjusting the shaft and cutter laterally to compensate for wear of the cutter, as set forth.

2. The combination of the loosely-rotating welt-supporting disk, a feed-roll located over said disk and provided with a groove or recess in its outer end, means for rotating the feed-roll, a rotary disk knife having its axis substantially at right angles with the axis of the feed-roll and arranged to project into the groove or recess in the end of the feed-roll, means for supporting and rotating the said knife, and means for adjusting the knife toward and from the feed-roll whereby wear of its cutting edge may be compensated for, as set forth.

3. The combination of the loosely-rotating beveled disk mounted on a fixed support, the feed-roll located over said disk, a pivoted frame supporting the shaft of said roll, a spring acting on said frame to press the feed-roll yieldingly toward the disk and permitting a yielding movement of the feed-roll, means for raising the feed-roll, a supplemental frame adjustably secured to the said pivoted frame, a cutter-shaft journaled in bearings in said supplemental frame and arranged substantially at right angles with the feed-roll shaft, means for rotating said cutter-shaft, and a disk knife or cutter affixed to said shaft and arranged to act on the projecting edges above the inseam at a point opposite the outer end of the feed-roll, the adjustability of the said supplemental frame enabling the knife to be adjusted toward and from the end of the feed-roll, as set forth.

In testimony whereof I have signed my name to this specification, in the presence of two subscribing witnesses, this 7th day of December, A. D. 1892.

CHAS. P. PERKINS.

Witnesses:
A. D. HARRISON,
W. S. McLEOD.